US012631277B1

(12) United States Patent
Tao et al.

(10) Patent No.: US 12,631,277 B1
(45) Date of Patent: May 19, 2026

(54) BALL VALVE BUTT-JOINT STRUCTURE

(71) Applicant: WTP Technology (Su Zhou) Co., Ltd., Wujiang (CN)

(72) Inventors: Zhiqiang Tao, Wujiang (CN); Huanyang Zhong, Wujiang (CN); Denghua Zhao, Wujiang (CN)

(73) Assignee: WTP Technology (Su Zhou) Co., Ltd., Wujiang (CN)

( * ) Notice: Subject to any disclaimer, the term of this patent is extended or adjusted under 35 U.S.C. 154(b) by 0 days.

(21) Appl. No.: 19/407,926

(22) Filed: Dec. 3, 2025

(30) Foreign Application Priority Data

Sep. 16, 2025 (CN) .......................... 202511316922.8

(51) Int. Cl.
| | |
|---|---|
| *F16L 37/373* | (2006.01) |
| *F16K 31/53* | (2006.01) |
| *F16L 37/248* | (2006.01) |

(52) U.S. Cl.
CPC .......... *F16L 37/373* (2013.01); *F16K 31/535* (2013.01); *F16L 37/248* (2013.01)

(58) Field of Classification Search
CPC ...... F16L 37/373; F16L 37/248; F16K 31/535
USPC ............... 137/614.01–614.6; 251/248, 250.5
See application file for complete search history.

(56) References Cited

U.S. PATENT DOCUMENTS

| | | | | | |
|---|---|---|---|---|---|
| 2,948,553 | A | * | 8/1960 | Gill ....................... | F16L 37/373 |
| | | | | | 137/614.02 |
| 4,622,997 | A | * | 11/1986 | Paddington ............. | F16L 37/62 |
| | | | | | 137/595 |

| | | | | | |
|---|---|---|---|---|---|
| 5,488,972 | A | * | 2/1996 | McCracken .......... | F16L 37/373 |
| | | | | | 137/614.01 |
| 5,507,313 | A | * | 4/1996 | LeDevehat ............. | F16L 37/62 |
| | | | | | 137/614.05 |
| 6,830,069 | B2 | * | 12/2004 | Shillito ................. | F16K 27/003 |
| | | | | | 137/613 |
| 8,082,947 | B2 | * | 12/2011 | Chang ................... | F16K 31/535 |
| | | | | | 251/249 |

(Continued)

FOREIGN PATENT DOCUMENTS

| | | |
|---|---|---|
| CN | 118208617 A | 6/2024 |
| CN | 120584253 A | 9/2025 |

(Continued)

OTHER PUBLICATIONS

CN202511316922.8 Office Action dated Oct. 22, 2025.

*Primary Examiner* — John Bastianelli
(74) *Attorney, Agent, or Firm* — Wood Herron & Evans LLP

(57) ABSTRACT

Provided is a ball valve butt-joint structure including two ball valve assemblies coaxially butt-jointed. Each ball valve assembly includes a valve body, a valve core, and a valve stem. The valve core is movably disposed within the valve body. One end of the valve stem is disposed to pass through the valve body and is fixedly connected to the valve core, and another end of the valve stem extends out of the valve body and is sleeved with a gear. A butt-joint end surface of each valve body is provided with a rack extending circumferentially. The rack of one ball valve assembly is capable of engaging with the gear of another ball valve assembly. At least one valve body has a limit pin elastically connected to the valve body. A butt-joint surface of at least another valve body is provided with a limit hole matching the limit pin.

17 Claims, 11 Drawing Sheets

(56)                    References Cited

U.S. PATENT DOCUMENTS

| 8,662,108 | B2 * | 3/2014 | Haunhorst | .......... | F16L 37/0841 |
| | | | | | 251/248 |
| 8,967,177 | B2 * | 3/2015 | Haunhorst | .............. | F16L 37/36 |
| | | | | | 137/614.01 |
| 2013/0032234 | A1 | 2/2013 | Densel et al. | | |
| 2021/0239250 | A1 | 8/2021 | Hamkens et al. | | |

FOREIGN PATENT DOCUMENTS

| EP | 0238117 | A2 | 9/1987 |
| GB | 844258 | A | 8/1960 |

* cited by examiner

BALL VALVE BUTT-JOINT STRUCTURE

CROSS-REFERENCE TO RELATED APPLICATION

The present application claims priority to Chinese Patent Application No. 202511316922.8, filed with the China National Intellectual Property Administration (CNIPA) on Sep. 16, 2025, the disclosure of which is incorporated herein by reference in its entirety.

TECHNICAL FIELD

The present disclosure relates to the technical field of ball valves, and specifically, a ball valve butt-joint structure.

BACKGROUND

In water supply systems, it is sometimes necessary to connect two ball valve assemblies in a butt-joint for communication. In the related art, four actions are required when the two ball valve assemblies are butt-jointed and assembled, that is, first, joints of two valve bodies are buckled; second, the two valve bodies are rotated to be tightened; and then, handles on the two ball valve assemblies are rotated in sequence to rotate and open valve cores inside the two valve bodies respectively, thereby enabling the liquid flow. In this way, the tightening and opening of the two ball valve assemblies are completed sequentially through the four actions, making the operation relatively cumbersome.

Therefore, there is an urgent need for a ball valve butt-joint structure to solve the above-described problems.

SUMMARY

The objective of the present disclosure is to provide a ball valve butt-joint structure, which can complete the tightening and opening of the two ball valve assemblies only by two actions and has a quick and convenient operation.

The present disclosure is achieved by the following technical solutions.

A ball valve butt-joint structure is provided. The ball valve butt-joint structure includes two ball valve assemblies coaxially butt-jointed. Each of the two ball valve assemblies includes a valve body, a valve core, and a valve stem. The valve core is movably disposed within the valve body. One end of the valve stem is disposed to pass through the valve body and is fixedly connected to the valve core, and another end of the valve stem extends out of the valve body and is sleeved with a gear. A butt-joint end surface of each valve body is provided with a rack extending circumferentially. The rack of one ball valve assembly of the two ball valve assemblies is capable of meshing with the gear of another ball valve assembly of the two ball valve assemblies. At least one valve body has a limit pin elastically connected to the valve body. A butt-joint surface of at least another valve body is provided with a limit hole matching the limit pin. The limit pin is movable axially relative to the valve body between a locked position in which the limit pin is inserted into the limit hole and an unlocked position in which the limit pin is disengaged from the limit hole.

As a solution, each of the two valve bodies has the limit pin elastically connected to the valve body, a butt-joint surface of each of the two valve bodies is provided with the limit hole, and the limit pin on one valve body of the two valve bodies is capable of being inserted into and matching the limit hole on another valve body of the two valve bodies.

As a solution, a toggle hole is disposed on a side wall of the valve body, the limit pin is fixedly connected to a toggle member, the toggle member is disposed to pass through the toggle hole and partially extends out of an outer surface of the valve body, and the toggle member is capable of driving the limit pin to slide axially.

As a solution, a free end of the limit pin is formed as a spherical surface.

As a solution, the valve body is provided with a guide hole that is open at one end, the guide hole extends in an axial direction of the valve body, and the limit pin is slidably disposed within the guide hole.

As a solution, a first elastic member is abutted between a hole bottom of the guide hole and the limit pin.

As a solution, one end of each valve body is provided with a flange, flanges of two ball valve assemblies are butt-jointed, the rack and a rotation hole which corresponds to a position of the gear and extends circumferentially are disposed on each flange, and the rack on one flange is capable of passing through the rotation hole on another flange and meshing with the gear corresponding to the rotation hole.

As a solution, the rotation hole includes a first hole segment and a second hole segment communicating with each other, a radial width of the first hole segment is greater than a radial width of the second hole segment, the rack includes a rack main body and a connection portion connected between the flange and the rack main body, a radial thickness of the rack main body is greater than a radial thickness of the connection portion, the rack main body is fitted to the first hole segment, and the connection portion is fitted to the second hole segment.

As a solution, a tightening pin is disposed on at least one flange, a slide hole extending circumferentially and matching the tightening pin is disposed on at least another flange, the tightening pin includes a large-diameter portion and a small-diameter portion that are coaxially connected, the small-diameter portion is connected between the large-diameter portion and the flange, the slide hole includes a penetrating segment and a limit segment communicating with each other, a maximum radial width of the penetrating segment is greater than a radial width of the limit segment, the large-diameter portion is fitted to the penetrating segment, and the small-diameter portion is fitted to the limit segment.

As a solution, on the same flange, the rotation hole, the rack, the slide hole, and/or the tightening pin are disposed at intervals in a circumferential direction of the flange.

As a solution, a mounting platform is disposed on the valve body, a mounting hole is disposed on the mounting platform, a limit top bead is disposed within the mounting hole, a second elastic member is abutted between the limit top bead and a hole bottom of the mounting hole, a lower surface of the gear is provided with a limit groove, and part of the limit top bead is capable of being selectively accommodated within the limit groove.

As a solution, a transmission member is fixedly sleeved outside the valve stem, a peripheral side of the transmission member is convexly provided with an abutment block, a mounting platform is disposed on the valve body, two limit blocks are disposed on the mounting platform, the two limit blocks are located on a rotation path of the abutment block, when the valve core is completely opened, the abutment block is capable of abutting against one limit block of the two limit blocks, and when the valve core is completely closed, the abutment block is capable of abutting against another limit block of the two limit blocks.

As a solution, an outer cover is buckled on the valve body, and the outer cover covers the gear.

The present disclosure has the following beneficial effects. The present disclosure provides the ball valve butt-joint structure. When the two ball valve assemblies are assembled, first, the two valve bodies are manually butt-jointed so that the rack of the first ball valve assembly meshes with the gear of the second ball valve assembly, and simultaneously, the rack of the second ball valve assembly meshes with the gear of the first ball valve assembly. In the butt-joint process of the two valve bodies, the limit pin on the first valve body is pushed into the valve body by the butt-joint surface of the second valve body, and simultaneously, the limit pin on the second valve body is pushed into the valve body by the butt-joint surface of the first valve body, whereby the limit pins are in the unlocked state. Then, the two valve bodies are rotated in opposite directions, the valve bodies may drive the racks on the valve bodies to rotate, the rack on the first valve body may drive the gear on the second valve body to rotate, the rack on the second valve body may drive the gear on the first valve body to rotate, each gear may drive its corresponding valve stem to rotate, and each valve stem may drive its corresponding valve core to rotate. When the valve bodies are rotated in place, the valve cores are completely opened, and in this case, each limit pin may be ejected and extend into the corresponding limit hole. At this point, the limit pins are in the locked position, and the two valve bodies are circumferentially locked so as to prevent the ball valve assembly from being closed due to accidental contact during use. It can be seen that the ball valve butt-joint structure provided in the present disclosure can simultaneously open the valve cores of the two ball valve assemblies only by two actions, that is, butt-jointing and rotating, during assembly, and can achieve circumferential tightening of the two ball valve assemblies.

Compared with the related art, the ball valve butt-joint structure provided in the present disclosure omits two actions, enables one-step completion, has a quick and convenient operation, and saves time and effort.

BRIEF DESCRIPTION OF DRAWINGS

In order to describe technical solutions in embodiments of the present disclosure or in the related art more clearly and understandably, the drawings used for describing the embodiments or the related art will be briefly introduced below. The drawings in the following description are merely some embodiments of the present disclosure. For those of ordinary skill in the art, other drawings may also be obtained without creative labor according to these drawings.

Figure 1:
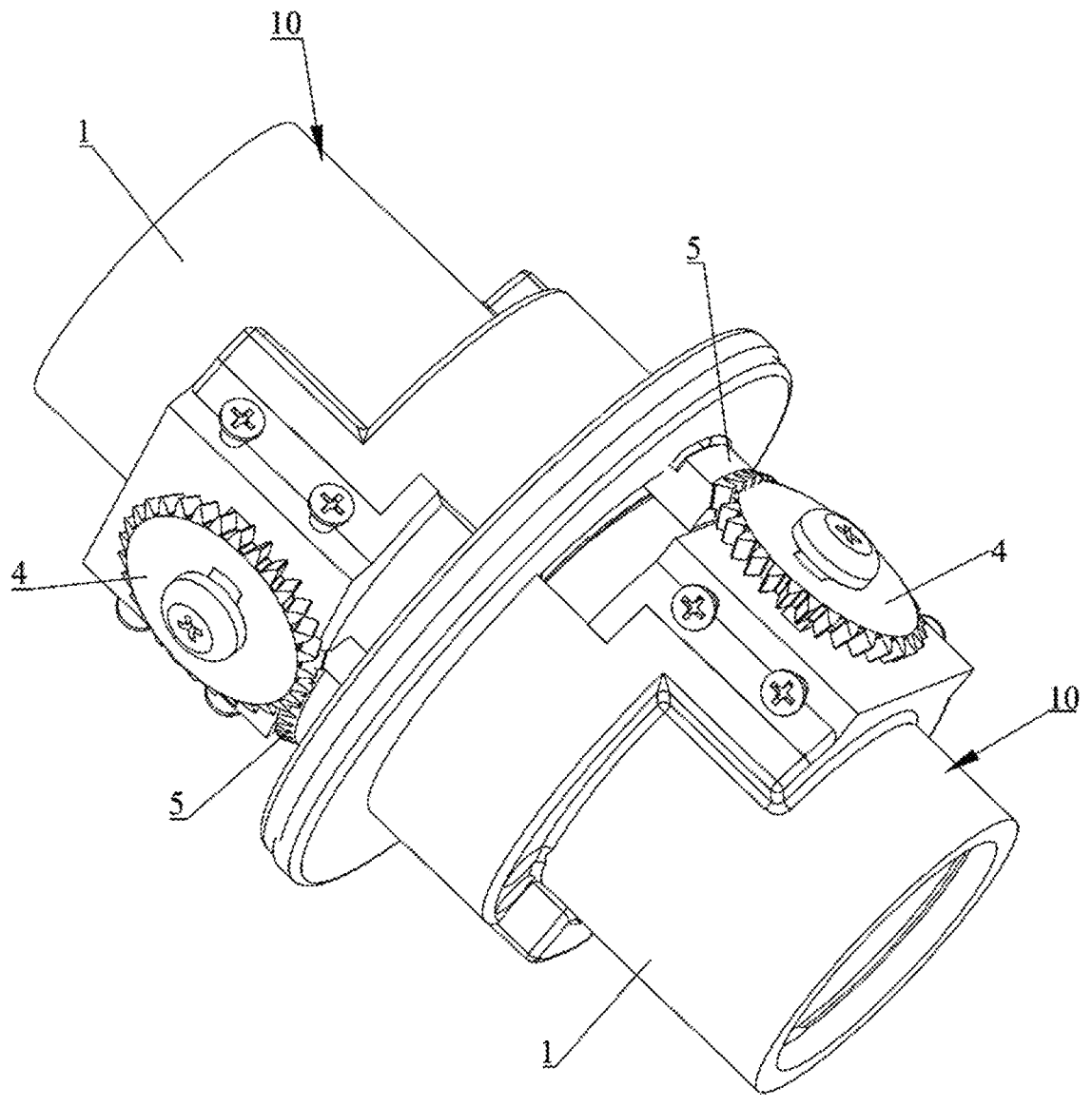
FIG. 1 is a schematic structural diagram of a ball valve butt-joint structure according to an embodiment of the present disclosure.

LIST OF REFERENCE NUMBERS 10 ball valve assembly
1 valve body
11 flange
111 rotation hole
1111 first hole segment
1112 second hole segment
112 slide hole
1121 penetrating segment
1122 limit segment
12 mounting platform
121 mounting hole
122 limit block
13 limit hole
14 toggle hole
15 guide hole
16 outer cover
2 valve core
21 flow-through hole
3 valve stem
31 transmission member
311 abutment block
4 gear
41 limit groove
5 rack
51 rack main body
52 connection portion
6 limit pin
61 spherical surface
62 first elastic member
7 toggle member
8 tightening pin
81 large-diameter portion
82 small-diameter portion
9 limit top bead
7 second elastic member

DETAILED DESCRIPTION

The present disclosure will be described in further detail below with reference to the accompanying drawings and embodiments. It is to be understood that the specific embodiments described herein are merely for illustration of the present disclosure, and are not intended to limit the present disclosure. In addition, it is to be noted that, for convenience of description, only some, but not all, of the structures related to the present disclosure are shown in the drawings.

In the description of the present disclosure, unless otherwise expressly specified and defined, the term "connected to each other", "connected", or "fixed" is to be construed in a broad sense, for example, as securely connected, detachably connected, or integrated; mechanically connected or electrically connected; directly connected to each other, indirectly connected to each other via an intermediary, internal connection between two elements, or interaction between two elements. For those of ordinary skill in the art, specific meanings of the preceding terms in the present disclosure may be understood based on specific situations.

In the present disclosure, unless otherwise expressly specified and defined, a first feature being "on" or "under" a second feature may include the first feature and the second feature being in direct contact, or may include the first feature and the second feature not being in direct contact but being in contact with each other through an additional feature therebetween. Moreover, the first feature being "on", "above" or "over" the second feature includes the first feature being directly on, above or over and obliquely on, above or over the second feature, or simply indicates that the first feature is at a higher level than the second feature. The first feature being "under", "below" or "underneath" the second feature includes the first feature being directly under, below or underneath and obliquely under, below or underneath the second feature, or simply represents that the first feature is at a lower level than the second feature.

In the description of this embodiment, the orientational or positional relationships indicated by terms "above", "below", "left", "right", and the like are based on the orientational or positional relationships shown in the drawings, and are merely for ease of description and simplifying an operation, rather than indicating or implying that the referred device or element must have a specific orientation and be constructed and operated in a specific orientation, and thus it is not to be construed as limiting the present disclosure. Moreover, the terms "first" and "second" are used only to distinguish between descriptions and have no special meaning.

Figure 2:
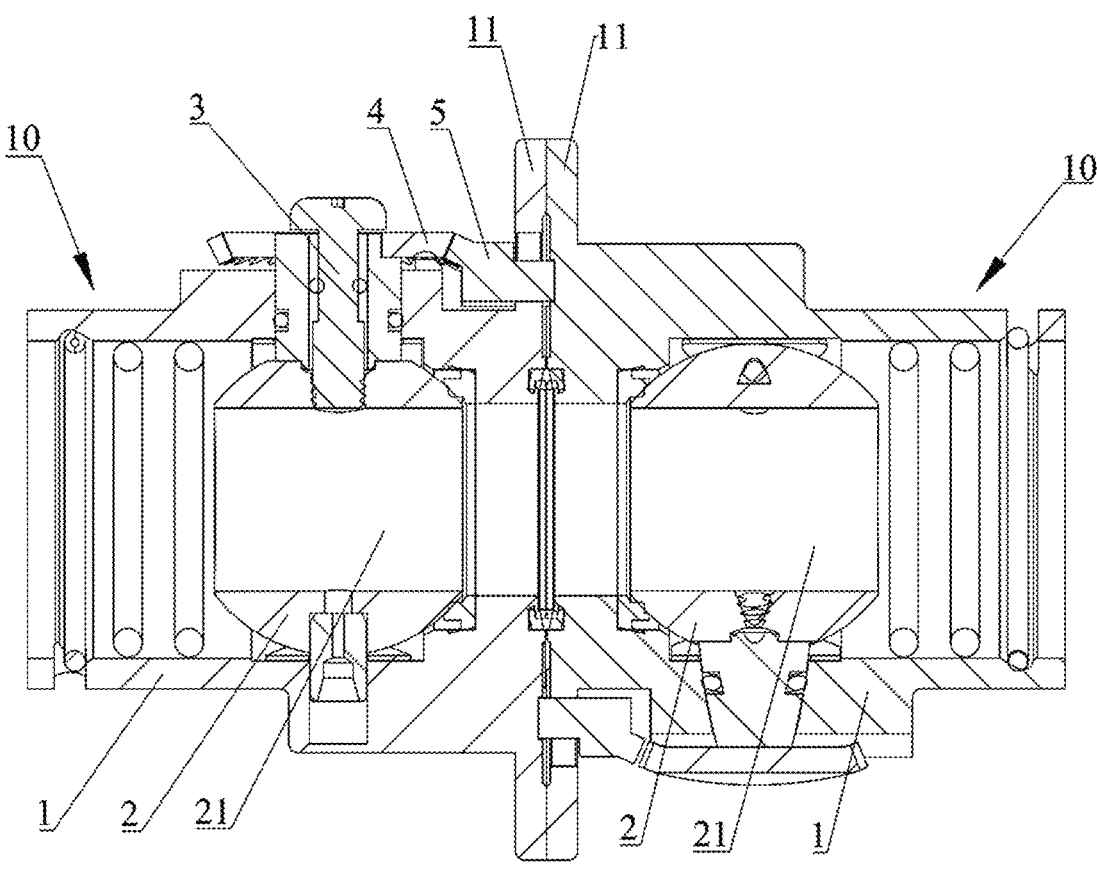
FIG. 2 is an axial sectional view of a ball valve butt-joint structure according to an embodiment of the present disclosure.

This embodiment provides a ball valve butt-joint structure. As shown in FIG. 1 and FIG. 2, the ball valve butt-joint structure includes two ball valve assemblies 10 that are coaxially butt-jointed and have the same structure. Each ball valve assembly 10 includes a valve body 1, a valve core 2, a valve stem 3, and a gear 4. During assembly, the two valve bodies 1 are coaxially butt-jointed, and a sealing ring is embedded on each of butt-joint surfaces of the two valve bodies 1 to achieve sealing after butt-jointing and prevent liquid leakage. The valve core 2 is spherical and is movably disposed within the valve body 1. One end of the valve stem 3 is disposed to pass through the valve body 1 and is fixedly connected to the valve core 2, and another end of the valve stem 3 extends out of the valve body 1 and is sleeved with the gear 4. The gear 4 may drive the valve stem 3 to rotate. A butt-joint end surface of each valve body 1 is provided with a rack 5 extending circumferentially. The rack 5 of one ball valve assembly 10 may mesh with the gear 4 of another ball valve assembly 10.

Figure 8:
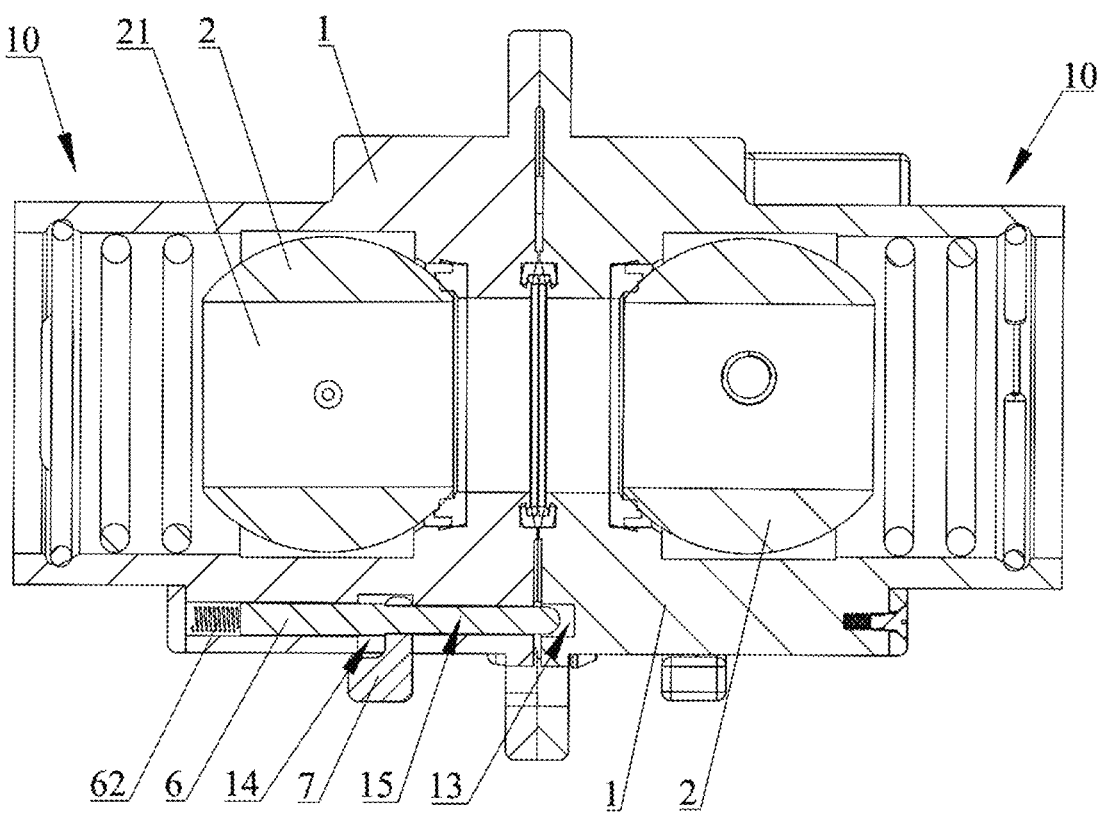
FIG. 8 is an axial sectional view of two ball valve assemblies after being rotated and tightened according to an embodiment of the present disclosure.

Further, as shown in FIG. 8, each of the two valve bodies 1 has the limit pin 6 elastically connected to the valve body 1, and the butt-joint surfaces of the two valve bodies 1 are each provided with a limit hole 13. The limit pin 6 and the limit hole 13 on the same valve body 1 are disposed adjacent to each other. The limit pin 6 on one valve body 1 may be inserted into and match the limit hole 13 on another valve body 1. Specifically, the limit pin 6 is movable axially relative to the valve body 1 between a locked position and an unlocked position. In the locked position, the limit pin 6 is inserted into the limit hole 13. In the unlocked position, the limit pin 6 is disengaged from the limit hole 13.

As shown in FIG. 2, the valve core 2 is provided with a flow-through hole 21 communicating with a flow-through channel of the valve body 1. When the flow-through hole 21 is perpendicular to an axis of the flow-through channel, the fluid can be shut off, and in this case, the ball valve assembly 10 is in a closed state. Rotating the valve stem 3 drives the valve core 2 to rotate, so that the overlapping area between the flow-through hole 21 and the flow-through channel may be adjusted, thereby adjusting the flow rate. When the axis of the flow-through hole 21 of the valve core 2 is completely coincident with the axis of the flow-through channel, the fluid may be conducted, and the valve core 2 may be switched from 0° to 90°, thereby achieving the opening of the ball valve assembly 10.

Figure 3:
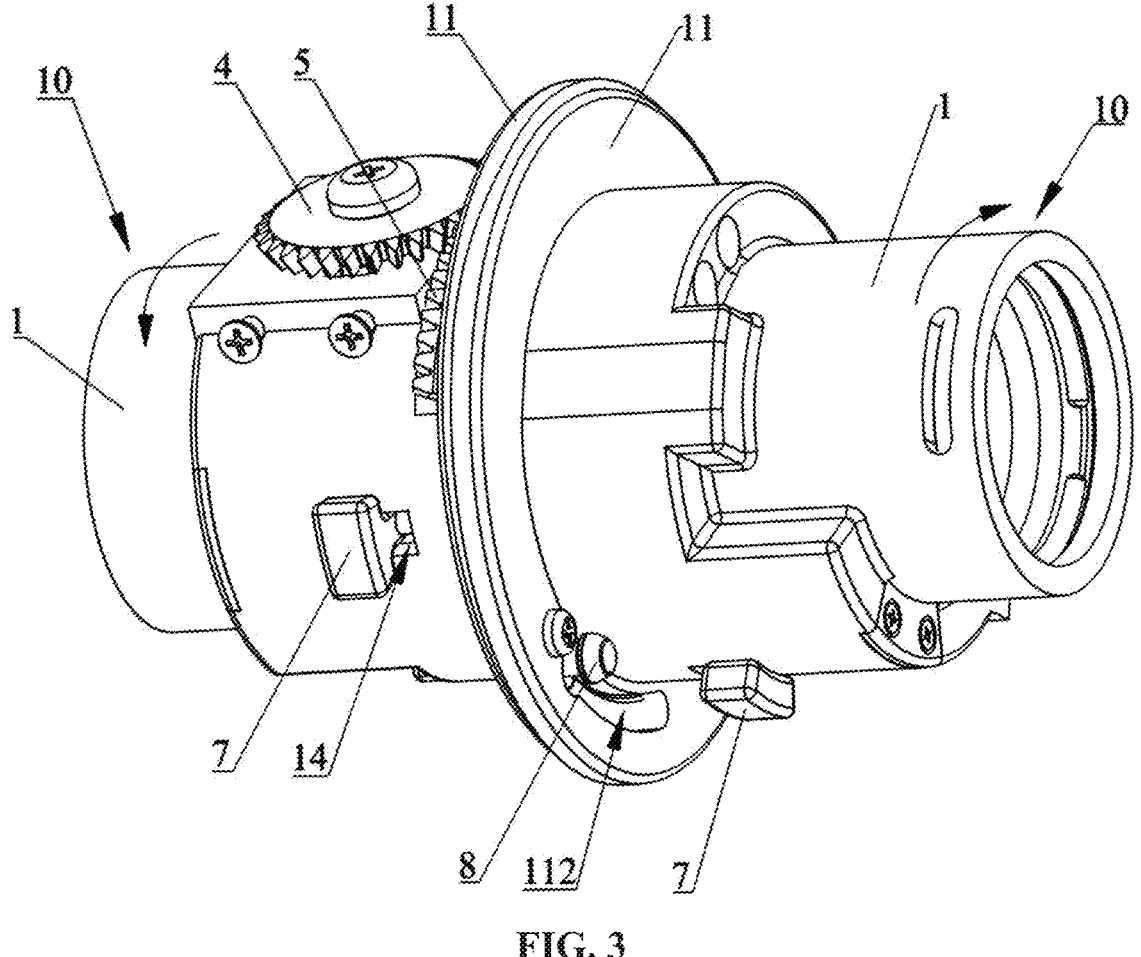
FIG. 3 is a schematic structural diagram of two ball valve assemblies upon being just butt-jointed according to an embodiment of the present disclosure.
Figure 4:
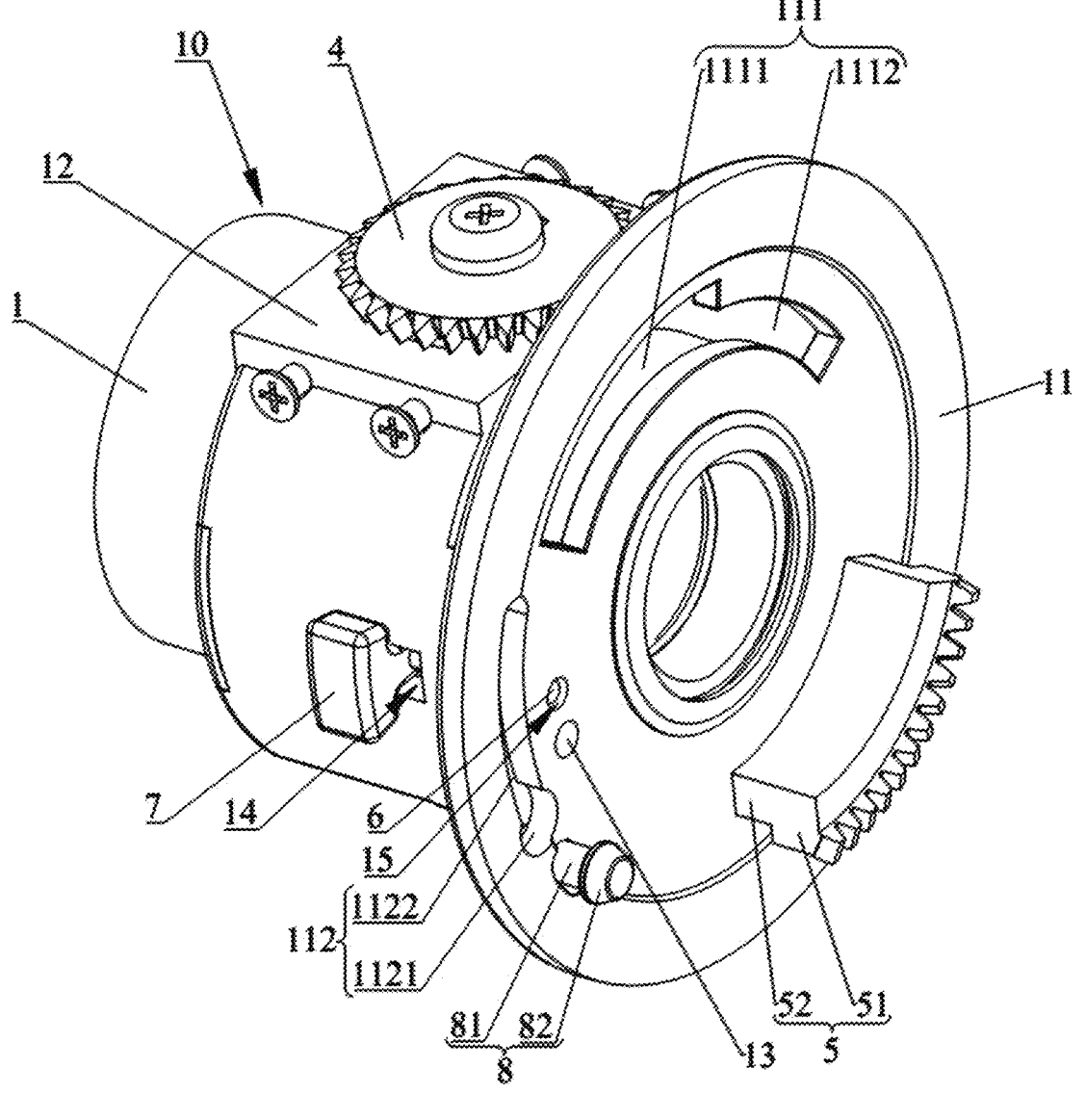
FIG. 4 is a schematic structural diagram of a single ball valve assembly upon being just butt-jointed according to an embodiment of the present disclosure.
Figure 5:
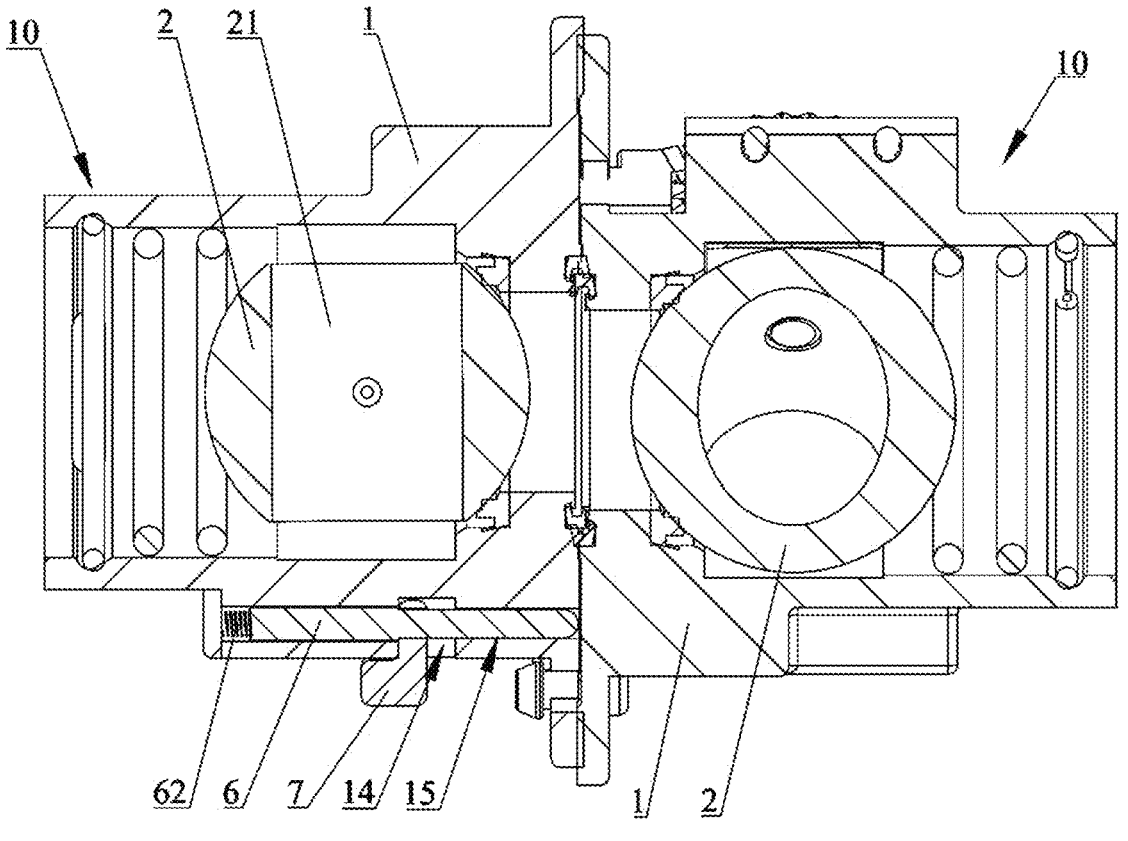
FIG. 5 is an axial sectional view of two ball valve assemblies upon being just butt-jointed according to an embodiment of the present disclosure.
Figure 6:
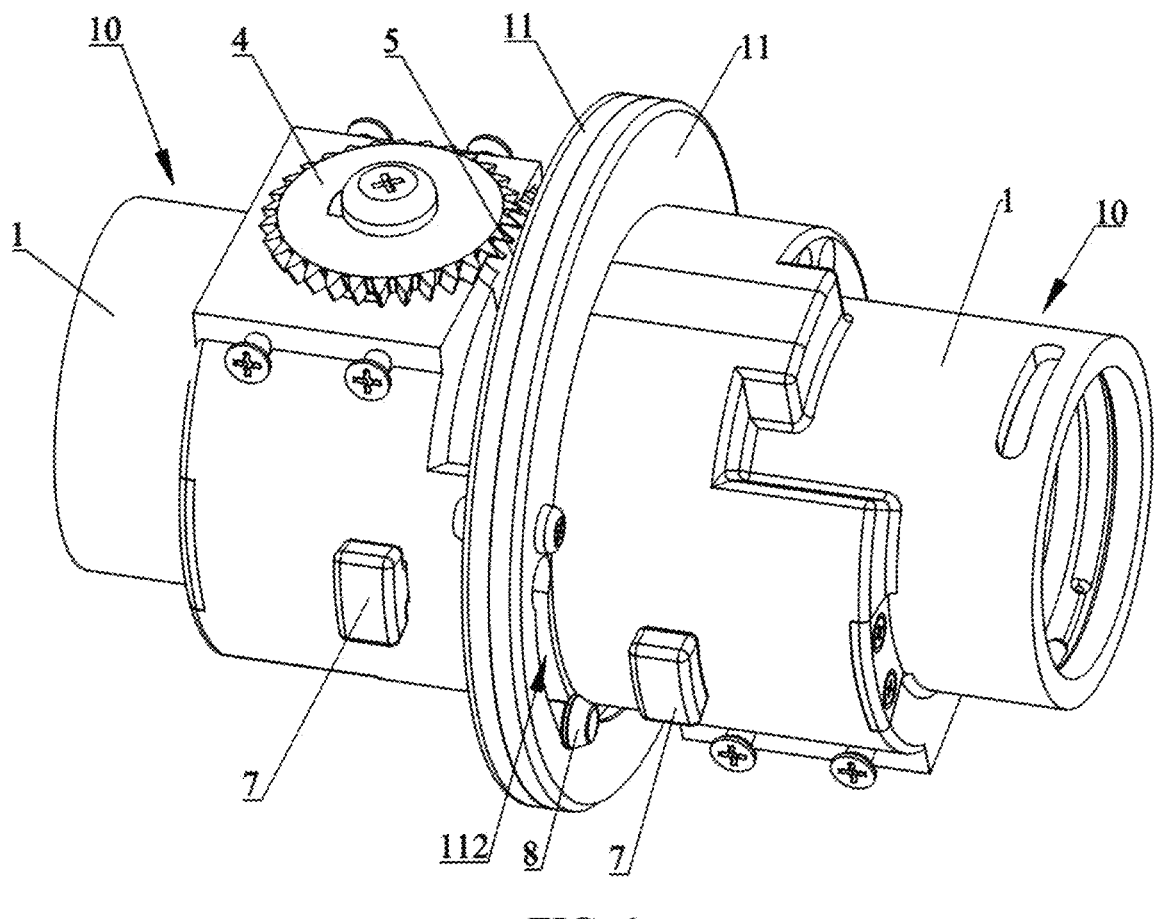
FIG. 6 is a schematic structural diagram of two ball valve assemblies after being rotated and tightened according to an embodiment of the present disclosure.
Figure 7:
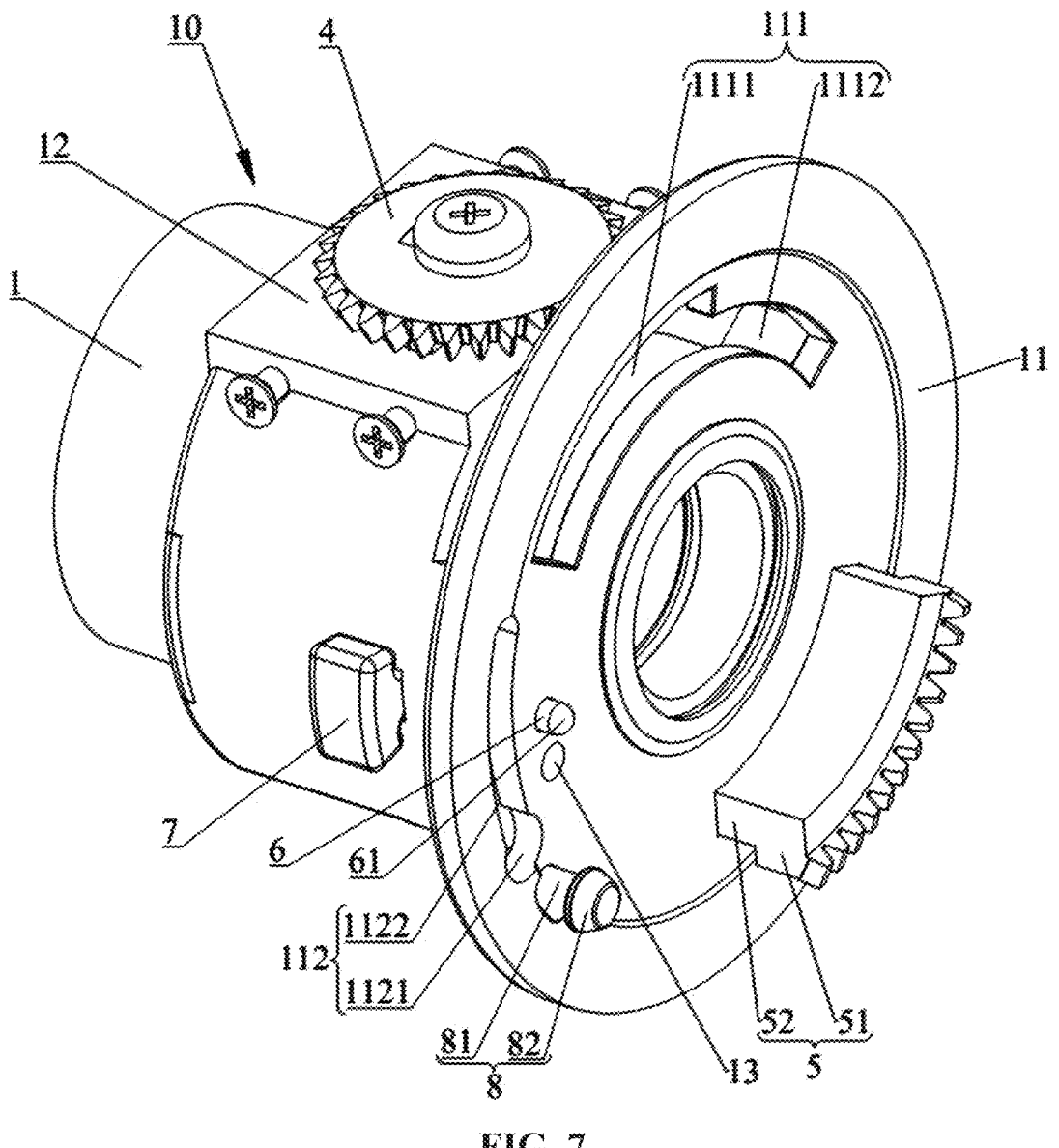
FIG. 7 is a schematic structural diagram of a single ball valve assembly after being rotated and tightened according to an embodiment of the present disclosure.

In this embodiment, when the two ball valve assemblies 10 are not butt-jointed, the valve core 2 is in a completely closed state, and the limit pin 6 is in an ejected state, that is, the limit pin 6 is ejected from the butt-joint surface of the valve body 1 (referring to FIG. 7). When the two ball valve assemblies 10 are assembled, as shown in FIG. 3 to FIG. 5, first, the two valve bodies 1 are manually butt-jointed so that the rack 5 of a first ball valve assembly 10 meshes with the gear 4 of a second ball valve assembly 10, and simultaneously, the rack 5 of the second ball valve assembly 10 meshes with the gear 4 of the first ball valve assembly 10. In the butt-joint process of the two valve bodies 1, the limit pin 6 on a first valve body 1 is pushed into the valve body 1 by the butt-joint surface of a second valve body 1, and simultaneously, the limit pin 6 on the second valve body 1 is pushed into the valve body 1 by the butt-joint surface of the first valve body 1, whereby the limit pins 6 are in the unlocked state. Then, the two valve bodies 1 are rotated in a direction of the arrow in FIG. 3, the valve bodies 1 may drive the racks 5 on the valve bodies 1 to rotate, the rack 5 on the first valve body 1 may drive the gear 4 on the second valve body 1 to rotate, the rack 5 on the second valve body 1 may drive the gear 4 on the first valve body 1 to rotate, each gear 4 may drive its corresponding valve stem 3 to rotate, and each valve stem 3 may drive its corresponding valve core 2 to rotate. As shown in FIG. 6 to FIG. 8, when the valve bodies 1 are rotated in place, the valve cores 2 are completely opened, and in this case, each limit pin 6 may be ejected and extend into the corresponding limit hole 13. At this point, the limit pins 6 are in the locked position, and the two valve bodies 1 are circumferentially locked so as to prevent the ball valve assembly 10 from being closed due to accidental contact during use.

It can be seen that the ball valve butt-joint structure provided in this embodiment can simultaneously open the valve cores 2 of the two ball valve assemblies 10 only by two actions, that is, butt-jointing and rotating, during assembly, and can achieve circumferential tightening of the two ball valve assemblies 10. Compared with the related art, the ball valve butt-joint structure provided in this embodiment omits two actions, enables one-step completion, has a quick and convenient operation, and saves time and effort.

In another embodiment, only one valve body 1 has a limit pin 6 elastically connected to the valve body 1, and the butt-joint surface of another valve body 1 is provided with the limit hole 13. The limit pin 6 is inserted into and matches the corresponding limit hole 13, which can also achieve the above-described circumferential tightening function, and the details are not repeated herein.

In an embodiment, as shown in FIG. 7, a free end of the limit pin 6 is formed as a spherical surface 61. It is to be understood that when the butt-joint surface of the valve body 1 pushes the limit pin 6 into the valve body 1, the limit pin 6 always abuts against the butt-joint surface of the valve body 1, and when the valve body 1 is rotated, a friction force exists between the limit pin 6 and the butt-joint surface of the valve body 1. The free end of the limit pin 6 is formed as the spherical surface 61, so that point-to-surface contact is formed between the limit pin 6 and the butt-joint surface of the valve body 1, thereby reducing the contact area. Compared with surface-to-surface contact, the point-to-surface contact can reduce the friction force, thereby making the rotation of the valve body 1 smoother, reducing wear on the limit pin 6, and thus extending the service life of the limit pin 6.

In an embodiment, as shown in FIGS. 4 and 5, the valve body 1 is provided with a guide hole 15 that is open at one end, the guide hole 15 extends in an axial direction of the valve body 1, and the limit pin 6 is slidably disposed within the guide hole 15. The limit pin 6 is slidable relative to the guide hole 15 when being ejected or pushed in. The limit pin 6 matches the guide hole 15, so that the guiding effect can be exerted on the movement of the limit pin 6, thereby making the movement of the limit pin 6 more stable.

As shown in FIG. 5, a first elastic member 62 is abutted between the hole bottom of the guide hole 15 and the limit pin 6. In this embodiment, the first elastic member 62 may be selected as a spring. With reference to FIG. 5, when the limit pin 6 is pushed into the valve body 1 by the butt-joint surface of the valve body 1, the first elastic member 62 is in a compressed state. As shown in FIG. 8, when the valve body 1 rotates until the limit pin 6 is directly opposite the limit hole 13, the first elastic member 62 rebounds and drives the limit pin 6 to extend into the limit hole 13. In this case, the limit pin 6 is in the locked position, and the elastic force of the first elastic member 62 can keep the limit pin 6 stably plugged into the limit hole 13, so as to circumferentially lock the valve body 1.

In this embodiment, as shown in FIG. 3, a toggle hole 14 is disposed on a side wall of each valve body 1. Each limit pin 6 is fixedly connected to a toggle member 7. The toggle member 7 is disposed to pass through the toggle hole 14 and partially extends out of the outer surface of the valve body 1. The toggle member 7 is capable of driving the limit pin 6 to slide axially. As shown in FIGS. 6 and 8, after the two ball valve assemblies 10 are butt-jointed and tightened, the limit pin 6 is inserted into the limit hole 13, and in this case, the toggle member 7 abuts against an end of the toggle hole 14 facing the butt-joint surface. When the two ball valve assemblies 10 need to be disassembled and closed, the operator uses their thumbs to toggle the two toggle members 7 axially in a direction away from each other, and the toggle member 7 drives the limit pin 6 to move. When the toggle member 7 abuts against an end of the toggle hole 14 facing away from the butt-joint surface, that is, the position as shown in FIG. 4, in this case, the limit pin 6 is completely disengaged from the limit hole 13 and in the unlocked state. Then, the two valve bodies 1 are rotated in a direction opposite to the arrow in FIG. 3, so that the rack 5 drives the gear 4 to rotate back, and the gear 4 drives the valve core 2 to close through the valve stem 3. When the valve body 1 is rotated back in place, the valve core 2 is completely closed. In this case, the two ball valve assemblies 10 are pulled in the direction away from each other, whereby the separation of the two ball valve assemblies 10 is achieved. After separation, the limit pin 6 pops out under the action of the first elastic member 62. Therefore, quick disassembly of the two ball valve assemblies 10 is achieved, which saves time and effort and improves the convenience of disassembly operations.

In an embodiment, as shown in FIG. 4, one end of each valve body 1 is provided with a flange 11. The outer diameter of the flange 11 is greater than the outer diameter of the valve body 1. The flanges 11 of the two ball valve assemblies 10 are butt-jointed. The above-described rack 5 and a rotation hole 111 which corresponds to a position of the gear 4 and extends circumferentially are disposed on each flange 11. The rack 5 and the rotation hole 111 on the same flange 11 are disposed opposite to each other. The rack 5 on one flange 11 may pass through the rotation hole 111 on another flange 11 and mesh with the gear 4 corresponding to that rotation hole 111. Specifically, the rack 5 on the first flange 11 may pass through the rotation hole 111 on the second flange 11 to mesh with the gear 4 on the second valve body 1, and the rack 5 on the second flange 11 may pass through the rotation hole 111 on the first flange 11 to mesh with the gear 4 on the first valve body 1. The positioning of the rotation holes 111 facilitates the coaxial butt-joint of the two ball valve assemblies 10. In addition, the two ends of the rack 5 may abut against hole walls at the two ends of the rotation hole 111, respectively, which plays a certain limiting role, thereby enabling the restriction and indication of the rotation angle of the valve body 1.

Specifically, as shown in FIG. 4, the rotation hole 111 includes a first hole segment 1111 and a second hole segment 1112 communicating with each other. A radial width of the first hole segment 1111 is greater than a radial width of the second hole segment 1112. The rack 5 includes a rack main body 51 and a connection portion 52 connected between the flange 11 and the rack main body 51, the radial thickness of the rack main body 51 is greater than the radial thickness of the connection portion 52, the rack main body 51 is fitted to the first hole segment 1111, and the connection portion 52 is fitted to the second hole segment 1112. When the two flanges 11 are butt-jointed, the rack main body 51 first passes through the first hole segment 1111 and meshes with the gear 4, and in this case, the connection portion 52 is also located in the first hole segment 1111. Then, during the rotation of the valve body 1, the connection portion 52 gradually rotates into the second hole segment 1112. When the valve body 1 rotates to a limit position, the connection portion 52 abuts against an end surface of the second hole segment 1112 to form a limit, and in this case, the valve core 2 is completely opened. Since the radial thickness of the rack main body 51 is greater than the radial width of the second hole segment 1112, the rack main body 51 cannot disengage from the second hole segment 1112, thereby achieving axial limit and tightening of the two valve bodies 1 after the two valve bodies 1 are butt-jointed, that is, the two valve bodies 1 cannot be separated, and preventing loosening. This tightening arrangement is simple and eliminates the need for a separate tightening structure, thereby avoiding an increase in structural complexity. In addition, after axial tightening is achieved through the matching of the rack 5 and the rotation hole 111, the butt-joint surfaces of the two valve bodies 1 are fitted tightly, thereby ensuring the sealing reliability between the butt-joint surfaces of the two valve bodies 1.

Further, as shown in FIGS. 3 and 4, a tightening pin 8 is disposed on each of the two flanges 11, and a slide hole 112 is disposed on each of the two flanges 11. The tightening pin 8 and the slide hole 112 on the same flange 11 are disposed adjacent to each other, and the tightening pin 8 on one flange 11 may match the slide hole 112 on another flange 11. The positioning of the slide hole 112 facilitates the coaxial butt-joint between the two ball valve assemblies 10. Furthermore, the tightening pin 8 may abut against hole walls at two ends of the slide hole 112, separately, which can also play a certain limiting role, thereby enabling the limitation and indication of the rotation angle of the valve body 1.

Specifically, the tightening pin 8 includes a large-diameter portion 81 and a small-diameter portion 82 that are coaxially connected. The small-diameter portion 82 is connected between the large-diameter portion 81 and the flange 11. The slide hole 112 includes a penetrating segment 1121 and a limit segment 1122 communicating with each other. The penetrating segment 1121 is a circular hole, and the limit segment 1122 is an arc hole. The maximum radial width of the penetrating segment 1121 is greater than the radial width of the limit segment 1122, the large-diameter portion 81 is fitted to the penetrating segment 1121, and the small-diameter portion 82 is fitted to the penetrating segment 1122. Similar to the matching of the rack 5 and the rotation hole 111, as shown in FIG. 3, when the two flanges 11 are just butt-jointed, the large-diameter portion 81 first passes through the penetrating segment 1121, the small-diameter portion 82 is located within the penetrating segment 1121, and then the small-diameter portion 82 is gradually rotated into the limit segment 1122 in the process of rotating the valve body 1. When the valve body 1 rotates to the limit position, as shown in FIG. 6, the small-diameter portion 82 abuts against the end surface of the limit segment 1122 to form a limit, and in this case, the valve body 2 is completely opened. Since the radial width of the large-diameter portion 81 is greater than the radial width of the limit segment 1122, the large-diameter portion 81 cannot disengage from the limit segment 1122, thereby achieving further axial limit and tightening of the two valve bodies 1 after the two valve bodies 1 are butt-jointed, that is, the two valve bodies 1 cannot be separated, and preventing loosening. In addition, after axial tightening is achieved through the matching of the tightening pin 8 and the slide hole 112, the butt-joint surfaces of the two valve bodies 1 are fitted tightly, thereby further ensuring the sealing reliability between the butt-joint surfaces of the two valve bodies 1.

In another embodiment, the tightening pin 8 may also be disposed only on one flange 11, and the slide hole 112 may be disposed on another flange 11. The tightening pin 8 matches the corresponding slide hole 112, which can also achieve the above-described axial tightening function, and the details are not repeated herein.

Optionally, in this embodiment, as shown in FIG. 4, on the same flange 11, the rotation hole 111, the rack 5, the slide hole 112, and the tightening pin 8 are disposed at intervals in a circumferential direction of the flange 11. With such an arrangement, after the two valve bodies 1 are rotationally tightened, all circumferential positions between the two flanges 11 can be fitted as tightly as possible, thereby improving the sealing reliability between the butt-joint surfaces of the two valve bodies 1.

Figure 9:
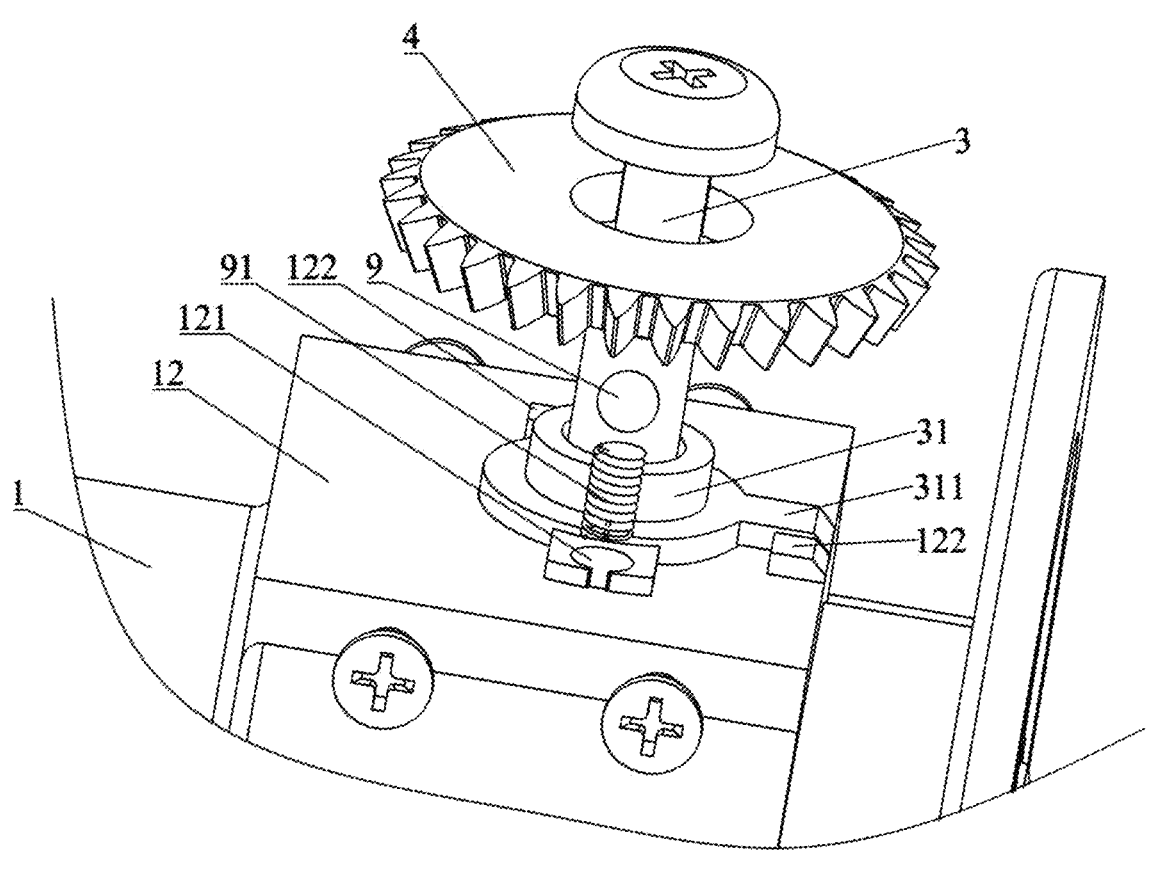
FIG. 9 is an exploded view of a single ball valve assembly according to an embodiment of the present disclosure.
Figure 10:
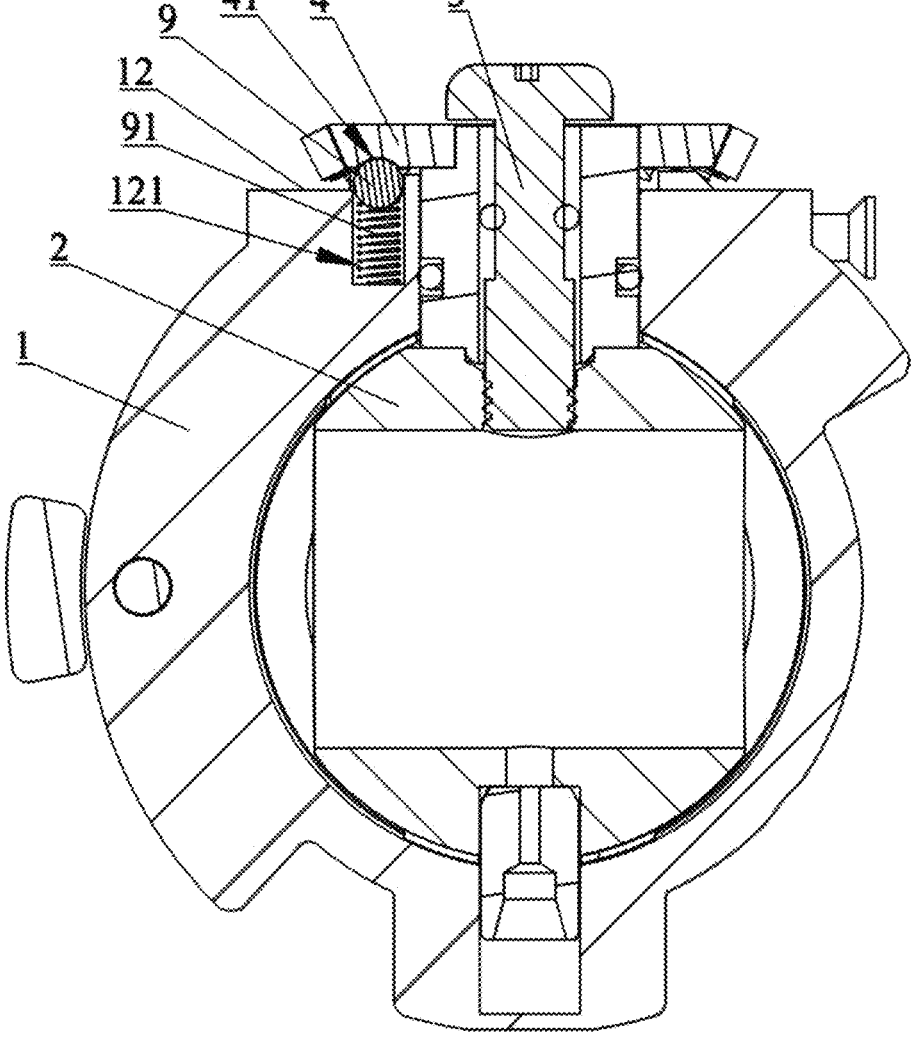
FIG. 10 is a radial sectional view of a single ball valve assembly according to an embodiment of the present disclosure.

In an embodiment, as shown in FIGS. 9 and 10, a mounting platform 12 is disposed on the valve body 1, and a mounting hole 121 is disposed on the mounting platform 12. A limit top bead 9 is disposed within the mounting hole 121. A second elastic member 91 is abutted between the limit top bead 9 and the hole bottom of the mounting hole 121. A lower surface of the gear 4 is provided with a limit groove 41, and the limit groove 41 is a groove smaller than a semicircle. Part of the limit top bead 9 may be selectively accommodated within the limit groove 41. In this embodiment, the second elastic member 91 may be selected as a spring. As shown in FIG. 10, when the two ball valve assemblies 10 are not butt-jointed, the valve core 2 is in the closed state, the limit top bead 9 is pushed up by the second elastic member 91, and an upper half portion of the limit top bead 9 is located outside the mounting hole 121 and is accommodated within the limit groove 41 at the bottom of the gear 4, which exerts a circumferential limit effect on the gear 4 to prevent the ball valve assembly 10 from being opened due to accidental contact and thus avoid liquid leakage. When the two ball valve assemblies 10 are butt-jointed, as long as the valve is rotated with a little force, the gear 4 may easily overcome the elastic force of the second elastic member 91 under the drive of the rack 5, so as to get rid of the restriction of the limit top bead 9 and rotate. Therefore, the limit top bead 9 does not affect the rotation of the gear 4 when the two ball valve assemblies 10 are butt-jointed.

In an embodiment, the mounting hole 121, the limit top bead 9, and the second elastic member 91 may be configured as a group as shown in FIG. 10. In another embodiment, the mounting hole 121, the limit top bead 9, and the second elastic member 91 may also be configured as two symmetrically distributed groups. This design can ensure that the gear 4 is stressed evenly and thus is prevented from skewing during rotation, which would otherwise impede the transmission with the rack 5.

In an embodiment, as shown in FIG. 9, a transmission member 31 is fixedly sleeved outside the valve stem 3. The gear 4 may be directly fixedly sleeved outside the valve stem 3, or may be sleeved outside the transmission member 31, thereby achieving power transmission with the valve stem 3 through the transmission member 31. A peripheral side of the transmission member 31 is convexly provided with an abutment block 311. The mounting platform 12 is disposed on the valve body 1. Two limit blocks 122 are disposed on the mounting platform 12. Two limit blocks 122 are located on a rotation path of the abutment block 311, and a central angle between mutually approaching side surfaces of the two limit blocks 122 is 90°. When the valve core 2 is completely opened, the abutment block 311 may abut against one of the limit blocks 122. When the valve core 2 is completely closed, the abutment block 311 may abut against another limit block 122. Therefore, through the above-described arrangement, the valve core 2 may be limited at the two positions of 0° and 90°, thereby ensuring the accuracy of closing and opening of the valve core 2.

Figure 11:
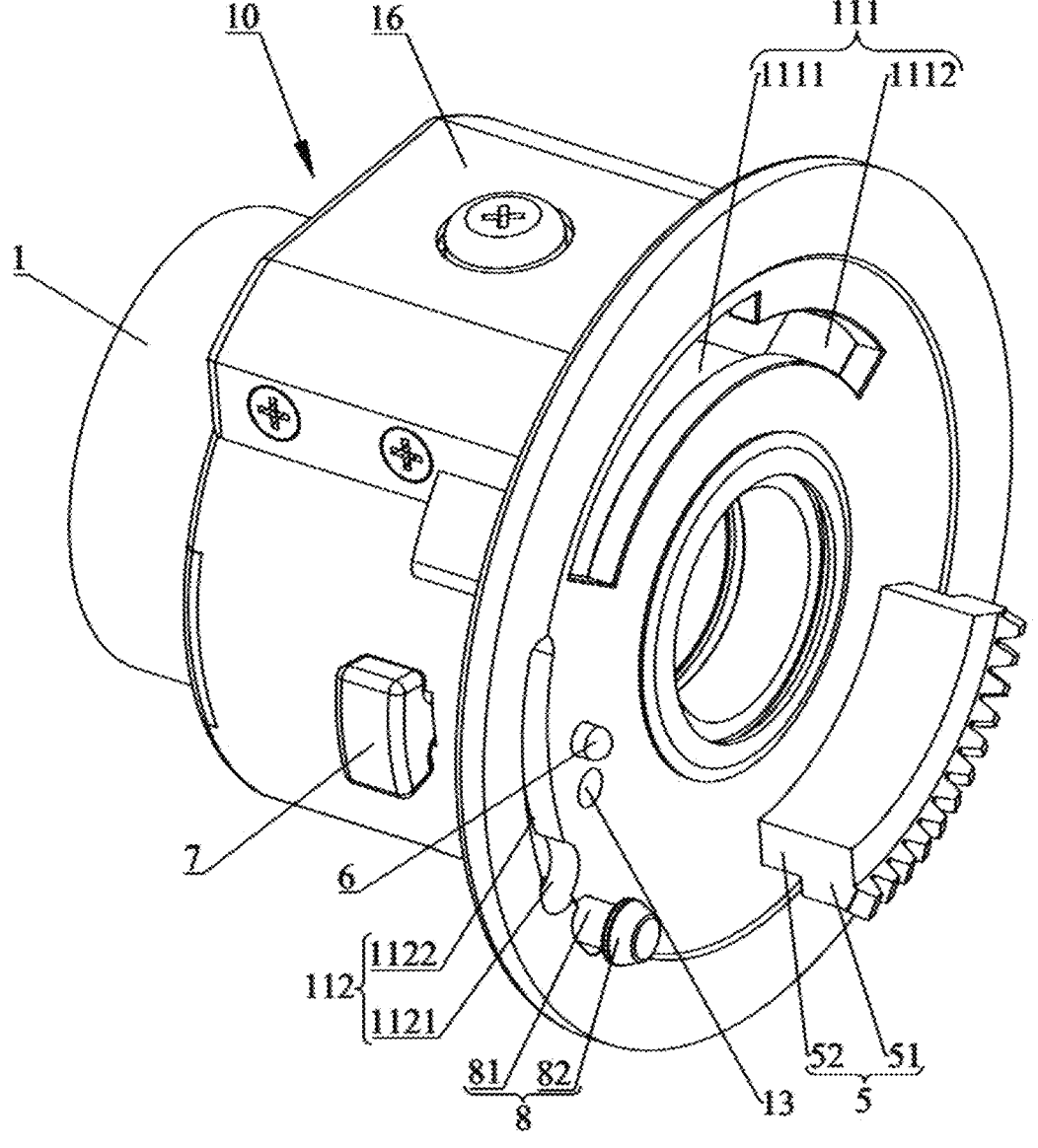
FIG. 11 is a structural diagram of a single ball valve assembly according to another embodiment of the present disclosure.

In an embodiment, as shown in FIG. 11, an outer cover 16 is detachably buckled on the valve body 1, and the outer cover 16 covers the gear 4. The outer cover 16 may shield the gear 4 to prevent the gear 4 from being exposed, thereby improving the aesthetics.

Apparently, the above-described embodiments of the present disclosure are merely examples for clearly illustrating the present disclosure and are not intended to limit the embodiments of the present disclosure. Other variations or modifications in different forms may be made in light of the above description for those of ordinary skill in the art. This need not be, nor should it be, exhaustive of all embodiments. Any modification, equivalent replacement, improvement, and the like, made within the spirit and principles of the present disclosure shall be included within the scope of protection of the claims of the present disclosure.

What is claimed is:

1. A ball valve butt-joint structure, comprising two ball valve assemblies coaxially butt-jointed, wherein each of the two ball valve assemblies comprises a valve body, a valve core and a valve stem, the valve core is movably disposed within the valve body, one end of the valve stem is disposed to pass through the valve body and is fixedly connected to the valve core, another end of the valve stem extends out of the valve body and is sleeved with a gear, a butt-joint end surface of each valve body is provided with a rack extending circumferentially, and the rack of one ball valve assembly of the two ball valve assemblies is configured to mesh with the gear of another ball valve assembly of the two ball valve assemblies; and at least one valve body has a limit pin elastically connected to the valve body, a butt-joint surface of at least another valve body is provided with a limit hole matching the limit pin, and the limit pin is movable axially relative to the valve body between a locked position in which the limit pin is inserted into the limit hole and an unlocked position in which the limit pin is disengaged from the limit hole.

2. The ball valve butt-joint structure of claim 1, wherein each of the two valve bodies has the limit pin elastically connected to the valve body, a butt-joint surface of each of the two valve bodies is provided with the limit hole, and the limit pin on one valve body of the two valve bodies is configured to be inserted into and match the limit hole on another valve body of the two valve bodies.

3. The ball valve butt-joint structure of claim 2, wherein a toggle hole is disposed on a side wall of the valve body, the limit pin is fixedly connected to a toggle member, the toggle member is disposed to pass through the toggle hole and partially extends out of an outer surface of the valve body, and the toggle member is configured to drive the limit pin to slide axially.

4. The ball valve butt-joint structure of claim 2, wherein a free end of the limit pin is formed as a spherical surface.

5. The ball valve butt-joint structure of claim 2, wherein the valve body is provided with a guide hole that is open at one end, the guide hole extends in an axial direction of the valve body, and the limit pin is slidably disposed within the guide hole.

6. The ball valve butt-joint structure of claim 5, wherein a first elastic member is abutted between a hole bottom of the guide hole and the limit pin.

7. The ball valve butt-joint structure of claim 1, wherein a toggle hole is disposed on a side wall of the valve body, the limit pin is fixedly connected to a toggle member, the toggle member is disposed to pass through the toggle hole and partially extends out of an outer surface of the valve body, and the toggle member is configured to drive the limit pin to slide axially.

8. The ball valve butt-joint structure of claim 1, wherein a free end of the limit pin is formed as a spherical surface.

9. The ball valve butt-joint structure of claim 1, wherein the valve body is provided with a guide hole that is open at one end, the guide hole extends in an axial direction of the valve body, and the limit pin is slidably disposed within the guide hole.

10. The ball valve butt-joint structure of claim 9, wherein a first elastic member is abutted between a hole bottom of the guide hole and the limit pin.

11. The ball valve butt-joint structure of claim 1, wherein one end of each valve body is provided with a flange, flanges of two ball valve assemblies are butt-jointed, the rack and a rotation hole which corresponds to a position of the gear and extends circumferentially are disposed on each flange, and the rack on one flange is configured to pass through the rotation hole on another flange and to mesh with the gear corresponding to the rotation hole.

12. The ball valve butt-joint structure of claim 11, wherein the rotation hole comprises a first hole segment and a second hole segment communicating with each other, a radial width of the first hole segment is greater than a radial width of the second hole segment, the rack comprises a rack main body and a connection portion connected between the flange and the rack main body, a radial thickness of the rack main body is greater than a radial thickness of the connection portion, the rack main body is fitted to the first hole segment, and the connection portion is fitted to the second hole segment.

13. The ball valve butt-joint structure of claim 11, wherein a tightening pin is disposed on at least one flange, a slide hole extending circumferentially and matching the tightening pin is disposed on at least another flange, the tightening pin comprises a large-diameter portion and a small-diameter portion that are coaxially connected, the small-diameter portion is connected between the large-diameter portion and the flange, the slide hole comprises a penetrating segment and a limit segment communicating with each other, a maximum radial width of the penetrating segment is greater than a radial width of the limit segment, the large-diameter portion is fitted to the penetrating segment, and the small-diameter portion is fitted to the limit segment.

14. The ball valve butt-joint structure of claim 13, wherein on a same flange, the rotation hole, the rack, and at least one of the slide hole or the tightening pin are disposed at intervals in a circumferential direction of the flange.

15. The ball valve butt-joint structure of claim 1, wherein a mounting platform is disposed on the valve body, a mounting hole is disposed on the mounting platform, a limit top bead is disposed within the mounting hole, a second elastic member is abutted between the limit top bead and a hole bottom of the mounting hole, a lower surface of the gear is provided with a limit groove, and part of the limit top bead is configured to be selectively accommodated within the limit groove.

16. The ball valve butt-joint structure of claim 1, wherein a transmission member is fixedly sleeved outside the valve stem, a peripheral side of the transmission member is convexly provided with an abutment block, a mounting platform is disposed on the valve body, two limit blocks are disposed on the mounting platform, the two limit blocks are located on a rotation path of the abutment block, when the valve core is completely opened, the abutment block is configured to abut against one limit block of the two limit blocks, and when the valve core is completely closed, the abutment block is configured to abut against another limit block of the two limit blocks.

17. The ball valve butt-joint structure of claim 1, wherein an outer cover is buckled on the valve body, and the outer cover covers the gear.

* * * * *